Patented Oct. 4, 1932

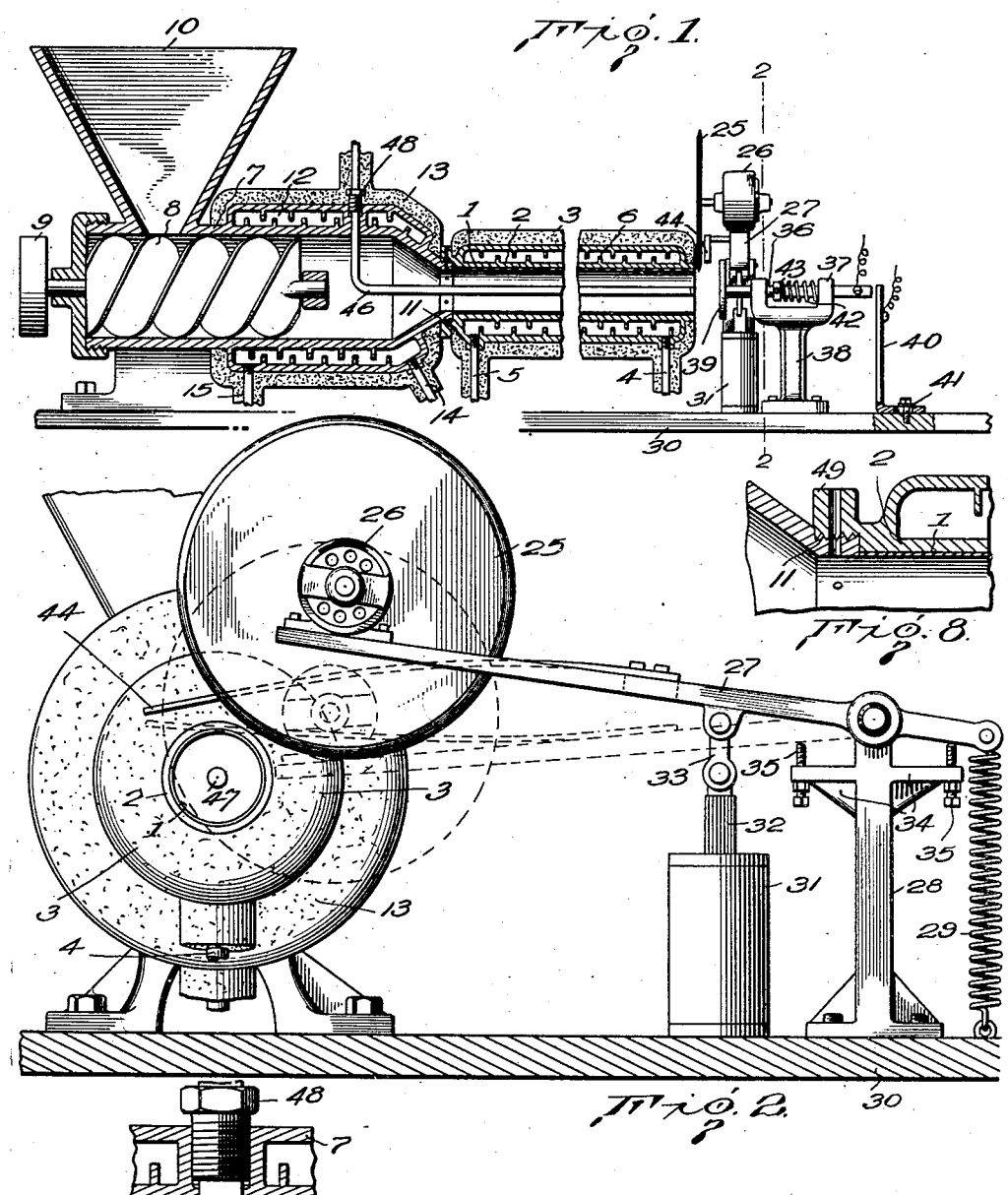

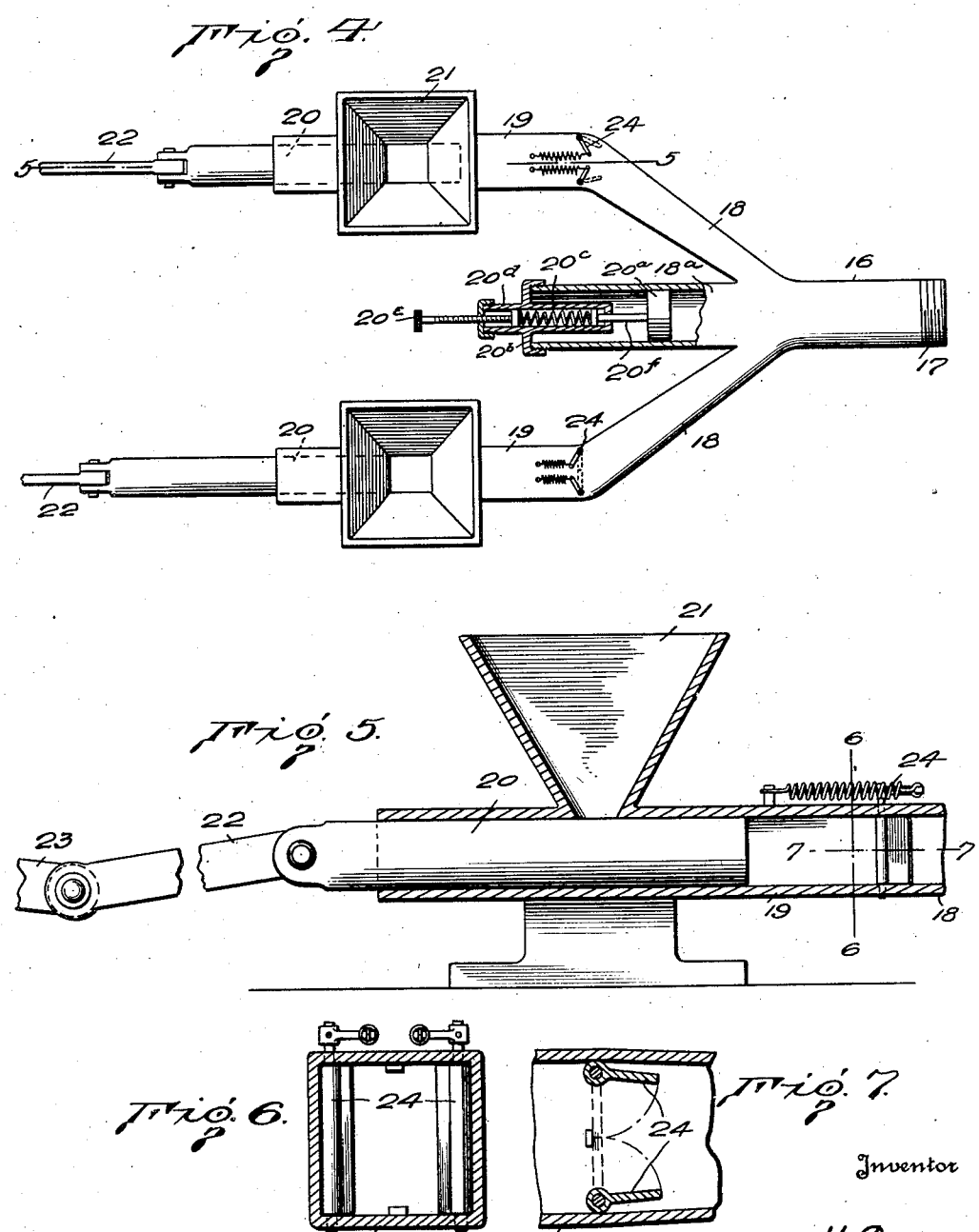

1,881,171

UNITED STATES PATENT OFFICE

EDWARD H. COOLEY, OF BELMONT, MASSACHUSETTS

METHOD OF PREPARING FISH AND OTHER MEATS

Application filed April 23, 1930. Serial No. 446,719.

My inventions relate to the art of preparing foods for market and to a new and useful apparatus which constitutes one concrete preferred means of practicing my novel process.

More particularly, my inventions are concerned with the production of a chilled or frozen cake of an edible commodity, such for example as flesh meat or fish meat, but neither the apparatus nor the process which together form the subject of this present application for Letters Patent is to be considered limited to use in connection with any specific kind of meat, both inventions being entirely operable in connection with a wide variety of food materials.

Inasmuch, however, as certain problems which have long been experienced in the fish industry gave rise to the inventions disclosed hereinafter, and since the inventions are peculiarly useful in their operation upon fresh fish meat, these inventions will be presently explained in terms of their application to use in connection with the preparation of fish meat into marketable form.

One specific embodiment of my present inventions, therefore, comprises means for producing from a plurality of fragments of fish meat a chilled or frozen cake adapted to be wrapped, transported and otherwise handled while maintained in its chilled or frozen condition preparatory to ultimate sale to the retail consumer. A cognate specific embodiment is a method of treating fragments of fish meat, regardless of the apparatus used, in order to produce the chilled or frozen cake which has been described.

Chilled or frozen fish products are not broadly new, and I make no claim to such an article, my present improvements being directed to a method and apparatus by which the article is produced.

Various attempts have heretofore been made to produce efficiently, quickly and economically an acceptable and attractive frozen fish product. It has been recognized that the most satisfactory manner of accomplishing the desired result comprises moving the originally relatively warm fish meat into the influence of a chilling medium and continuing the progress of the meat uninterruptedly under this influence until the material has attained the required temperature. My present inventions employ this principle, but differ from the practices of the prior art in that I obtain the ultimate product more quickly, more efficiently and at less expense.

A specific object of my present inventions, therefore, is the production of a frozen fish cake by a single, unitary machine, the operation of which is entirely automatic, requiring the attention of an operator only for the introduction of raw, unprepared fish meat into the machine.

A further specific object is to provide mechanism which will operate upon soft, irregular fragments of fish meat to associate the same into a shaped body of sufficient hardness to be divided into cakes of uniform size and dimensions.

A further object is to provide mechanism for chilling a food material which includes means for subjecting the entire surface of the material to intimate actual contact with a chilled surface, without the interposition of air spaces or solid foreign matter between the chilling surface and the material under treatment.

Other and further objects and advantages of the present inventions will sufficiently appear from the description hereinafter, taken in conjunction with the accompanying drawings which illustrate certain preferred forms of embodiment of mechanism according to the principles of my present machine and a certain preferred manner of practicing my new process.

In the accompanying drawings which form part of this application for Letters Patent, and in which the same reference characters indicate the same part in different views.

Figure 1 is a longitudinal vertical section of one type of apparatus contemplated by my invention;

Figure 2 is a relatively enlarged cross sectional view taken along the line 2—2 of Figure 1;

Figure 3 is a detail view in longitudinal vertical section of the core used in the apparatus;

Figure 4 is a top plan view of an alternative type of feed mechanism which may in practice be substituted for the feed mechanism shown in Figure 1;

Figure 5 is a longitudinal vertical sectional view of the feed mechanism of Figure 4 taken along the line 5—5 thereof;

Figure 6 is a cross sectional view of the check valve mechanism of Figs. 4 and 5, taken along the line 6—6 of Figure 5;

Figure 7 is a horizontal longitudinal section of the check valve mechanism, taken along the line 7—7 of Figure 5; and Figure 8 is a detail view in cross section of a lubricant introducing means.

Referring now to the drawings, and first to Figure 1, the reference numeral 1 indicates a conduit which constitutes in my apparatus a preferred means for practicing the novel combination of forming and chilling operation of my process. The conduit shown in the drawings consists of a metal tube of circular cross section, but it is to be understood that the cross sectional shape of the conduit forms no part of my present invention, the apparatus and the process being operable without regard to the specific design or contour of conduit which any given user may elect to employ.

The conduit 1 is preferably formed of a material of high heat conductivity, of relatively thin gauge, and of a length which will have to be determined in practice by the diameter of the conduit, the speed at which food material passes through it, the temperature of the refrigerant in its surrounding jacket (presently to be described) and other factors.

The conduit 1 preferably consists of an inner sleeve of thin, highly conductive material, such for example as metal, which is removable for cleaning purposes and is surrounded by a jacket 2. The jacket 2 is covered by an insulating medium 3, which may be a dead air or evacuated chamber, or a layer of cork, asbestos or the like, as may be preferred. The interior of the jacket is adapted to be traversed by a suitable fluid refrigerant, and the jacket is therefore provided at suitable points with an inlet port 4 and an outlet port 5, which are connected to any convenient source of refrigerant supply and an interposed circulating means (not shown). I have found it desirable to provide the inner surfaces of the jacket 2 with baffle plates or the like 6 for the purpose of compelling the circulating refrigerant to take a comparatively turbulent course through the jacket, to prevent the formation in the jacket of dead zones of refrigerant at relatively high temperatures.

At one end of the conduit 1 is located feeding mechanism the function of which is to introduce into and move through the conduit the food material which is to be treated.

In the drawings I have shown two preferred types of feeding mechanism, but it is to be understood that the broad principles of my inventions are not to be limited to any specific form of feeding mechanism, although I prefer to use some means for accomplishing a continuous and uninterrupted movement of the food material through the chilling conduit 1.

The feed mechanism of Figure 1 comprises essentially a cylinder or equivalent container 7, which may be of larger diameter than the conduit 1, provided with an axially mounted screw 8, rotatable by a pulley 9 or in any other convenient way. A hopper 10 communicates with the interior of the feed cylinder. One end of the feed cylinder is constricted (if the diameter of the feed cylinder is greater than that of the conduit 1) and is provided with means for effecting a tight union with the conduit 1, such for example as the screw threaded connection 11 shown in the drawings. By this construction it will be apparent that a plurality of conduits 1, of any desired cross sectional contour as has been explained, may be interchangeably connected to the feed cylinder 7.

A refrigerant jacket 12 and an insulating covering 13 preferably surround the portion of the feed cylinder near the end which carries the conduit connection 11, and the jacket is connected by an inlet port 14 and an outlet port 15 to a suitable source of refrigerant under pressure (not shown).

An alternative type of feed mechanism is shown in Figs. 4 to 7 inclusive. In these figures the reference numeral 16 indicates a feed cylinder provided with screw threads 17 at one end for engagement with conduit 1, and having, in the embodiment of the invention shown in Fig. 4, a pair of branches 18 and a third branch 18a. Each branch 18 communicates with a pressure-cylinder 19 containing a piston 20 and carrying a hopper 21. The two pistons 20 are adapted to be reciprocated in opposite phase by any suitable driving means, such for example as the connecting rods 22 journalled on crank arms 23 disposed 180 degrees apart around a crank shaft (not shown). Any suitable check valve mechanism 24 interposed in each of the cylinders 19 between the limit of travel of the piston 20 and the branch 18 serves to prevent back flow of the food material in the cylinder 19 during the return stroke of piston 20.

It will be appreciated that this arrangement will be effective to cause each of the pistons 20 to be moved forward on its compression stroke during the whole time that the other piston is moving backward on its return stroke. There will, however, be two points in each complete cycle of piston operation when both pistons 20 will be momentarily motionless while reversing the direction of their movement, and during these two instants the pistons will not exert pressure in the feed cylinder 16. In order to render the pressure in the feed cylinder 16 constant and uninterrupted, and thereby produce continuous movement of the food material through the conduit 1, I prefer to provide with the feed mechanism of Figs. 4 to 7 inclusive some type of pressure equalizing means, such for example as that shown in Fig. 4 which consists essentially of an equalizing cylinder 18a containing a piston 20a. A cap 20b extending from the rear end of the cylinder 18a carries a compression spring 20c in a housing 20d, adjustable by a setscrew 20e. The stem 20f mounted on piston 20a engages spring 20c, and moves rearwardly against the expansive force of the spring under the influence of pressure in the feed cylinder 16. When this pressure in the feed cylinder tends to fail momentarily during change in the direction of movement of the pistons 20, the piston 20a moves toward the feed cylinder to maintain the pressure therein substantially constant.

It will be appreciated that the operative effect of either of the feed mechanisms shown in the drawings is to provide a positive, constant and uninterrupted movement through the conduit 1 of food material which has been put in the hoppers 10 or 21.

Associated with the conduit 1 is mounted any suitable means for cutting the column of food material. One preferred type of cutting mechanism is shown in the drawings, and consists essentially of a disk 25 having a peripheral cutting edge and rotatable by an electric motor 26 mounted on an arm 27 which is pivoted intermediate its ends to a standard 28. A coiled spring 29 is hung under tension between the outer end of the arm 27 and the bed 30 of the machine to hold the disk 25 normally up and out of alignment with the mouth of the conduit 1. A solenoid 31 is mounted on the bed 30 and has a core 32 which is connected by a link 33 to the arm 27 between its pivot and its disk across the orifice of the conduit 1. The plane of the movement of disk 25 is preferably parallel and closely adjacent to the plane of the orifice of conduit 1. Brackets 34 are provided on the standard 28 in the plane of movement of the arm 27 and carry set screws 35 by which the limits of rocking movement of the cutting disk may be adjusted.

In order to operate the cutting disk to traverse the conduit 1 when and only when a predetermined length of frozen food material has issued therefrom, I provide trip mechanism, a preferred form of which is shown in the drawings and which will now be described.

A stem 36 is slidably mounted in alignment with the axis of conduit 1 in a pair of spaced bearings 37 of a bracket 38 which is mounted on the bed 30. The end of stem 36 adjacent to the conduit orifice carries a plate 39, and the opposite end of the stem 36 constitutes a contact point which is adapted to engage another contact element 40 adjustably mounted by a pin and slot connection 41 on the bed 30. A coil spring 42 disposed around the stem 36 between the outermost bearing 37 and an adjustable collar 43, serves to urge the plate 39 toward the conduit orifice. It will be appreciated that the extent to which the plate 39 may approach the orifice of conduit 1 is determined by the adjusted position of the collar 43 on the stem 36, since the contact of the collar with the bearing 37 which is adjacent the orifice prevents further movement of the plate 39 toward the orifice.

For a purpose which will presently be explained, a finger 44 comprising a light leaf spring is preferably provided on the arm 27, and projects outwardly therefrom to extend adjacent to the motor side of the cutting disk 25. The relation of finger 44 and cutting disk 25 is such that an object cut by the disk will be engaged by the finger shortly before the cutting operation is completed.

In one form of embodiment my food treating machine includes a chilled core disposed axially of the conduit 1, comprising a relatively small inner tube 45 and a larger outer tube 46.

The outer tube extends from the plane of the conduit orifice, where it is closed by a plug 47, to a point in the cylinder 7 just in advance of the screw 8 where its direction changes from axial to radial of the cylinder 7, so that the tube may penetrate the wall of the cylinder by means of a packing nut 48 and be connected to an outside source of refrigerant under pressure (not shown). The inner tube 45 takes the same course, completely enclosed by the outer tube 46, except that the inner tube terminates in an open end a slight distance behind the plug 47. It will be appreciated that this double tube arrangement provides means for circulating a refrigerant through the core formed by both tubes to have the double effect of forming the column of food material passed through conduit 1 into a column having a hollow bore and of subjecting the inner surface of the column to the influence of refrigerant, the more quickly to effect complete refrigeration of the food.

It is to be noted that the machine and method which form the subjects of the present application contemplate moving the originally soft fragments of food material constantly and uninterruptedly through the conduit 1. This continued movement of the material during its forming and freezing not only contributes materially to the speed, economy and efficiency of the production of the ultimate product, but very largely overcomes the tendency of the freezing food material to adhere to the inner surface of the conduit.

I have found that the tendency of some food commodities to adhere to the surface of the freezing and forming conduit is so pronounced as to necessitate the imposition of considerable pressure on the material in the feed cylinder after a short period of inoperation of the machine. To offset this contingency, I have found it desirable to provide means for introducing a suitable edible lubricant, such as glycerine, fish oil or the like, into the conduit, preferably at or near its point of connection 11 with the cylinder 7. The lubricant introducing means may take any suitable form and location, such for example as a collar 49, threaded over the connection 11, and having perforations registering with perforations in the interfitted ends of cylinder 7 and conduit 1 through which the lubricant may be forced into the conduit 1 from a pressure source (not shown).

Having thus described the stucture of my new machine, its mode of operation, constituting one preferred manner of practicing my improved method of treating food material, will now be briefly explained in connection with its action on one specific kind of food material, i. e., fish meat.

The normal unit of material heretofore used in the freezing operations of the fish industry is the fillet, that is to say, a strip of boneless meat cut from the flanks of the fish. When the fillets have been removed from a fish considerable quantity of meat is left adhering to the carcass. This meat is removed in the form of scraps, which are used in a variety of ways, but do not, of course, bring the high prices commanded by the fillets.

In the application of my present invention to use in the fish industry, either fillets, or scraps, or both may constitute the raw material to be treated. The fish meat is introduced into the hopper 10 or hoppers 21 and fed through cylinder 7 or cylinder 19 in a continuous, uninterrupted flow into conduit 1. The originally soft and relatively warm fragments of material placed in the hopper are formed into a comparatively compact mass, the temperature of which is progressively lowered by its passage through the cylinder 7 or 19 and conduit 1 while subjected to the influence of the refrigerant circulating through jackets 12 and 2. Passage of the compact mass through conduit 1 completes the forming and chilling operations so that when the speed of passage through the conduit, the temperature of the refrigerant, and other variable factors are properly adjusted, a solid column of food material will issue from the orifice of the conduit. It is to be noted that the freezing operation is materially accelerated by the use of the chilling core comprising the tubes 45 and 46 which induces refrigeration of the column from its center, as well as from its outer surface.

The issuing column is in condition to be divided into sections of any suitable predetermined size. If desired, the frozen column may be severed at the orifice of the conduit 1 into comparatively long lengths of say several feet and then stored under refrigeration for future subdivision into cakes. I prefer, however, to practice the operation of cutting the column into cakes in connection with its passage through the conduit, by means of the cutting mechanism which has been described, the operation of which is as follows:

The end of the issuing column meets the plate 39 and moves this plate against the expansive force of the spring 42 until the rear end of the stem 36 engages the contact element 40. This engagement completes an electrical circuit which includes in series the solenoid 31 and a source of electricity (not shown), to energize the solenoid, thus depressing the core 32 to cause the rotating cutting element 25 to move downwardly across the orifice of the conduit. The spring finger 44 is adjusted to contact with the upper surface of the extruded portion of the column of food material just before the disk 25 has completed its cutting stroke, so that when the cut is completed the severed cake will be forced downwardly despite any tendency to adhere to the plate 39.

An endless belt or other carrier (not shown) may be provided beneath the orifice of conduit 1 to move the cakes to any suitable wrapping or packaging machine. The cakes when wrapped and packed in appropriate insulating and waterproof containers may be stored and shipped under refrigeration for indefinitely long periods pending their ultimate use.

It is to be noted that while I have illustrated and described in this application for Letters Patent my improved apparatus in certain preferred forms of embodiment, the invention is nevertheless capable of being exemplified in other and different forms. Thus, for example, while I have shown and described the food cutting mechanism located at the extreme outer end of the forming and chilling conduit 1, it is within the spirit of my invention to position any suitable cutting element at any point along the length of the conduit at which the moving food material shall have been chilled sufficiently to maintain its form after cutting. Such modification and others which will readily occur to those skilled in the art are to be deemed within the spirit of my invention and within the scope and purview of the appended claims.

Having thus described my invention, what I claim and desire to secure by Letters Patent is:

1. A method of reducing discrete fragments of soft meat material to a solid hard cake differing in shape and dimensions from its component fragments which consists in forming a column of the fragments to provide a body having uniformly throughout the length of the column the cross-sectional shape of the desired cake, rectilinearly moving the column by substantially continuously applying pressure axially to one end thereof while maintaining the material of the column under peripheral confinement to prevent substantial radial expansion, simultaneously lowering the temperature of the material of the column progressively along its path of movement sufficiently to fix its shape and compact and freeze the fragments into a hard, rigid mass, and then severing from the other end of the column a section equal in thickness to the thickness of the desired cake.

2. A method of reducing discrete fragments of soft meat material to a solid hard cake differing in shape and dimensions from its component fragments which consists in forming a column of the fragments to provide a body having uniformly throughout the length of the column the cross-sectional shape of the desired cake, substantially continuously moving the column axially along an elongated rectilinear path under peripheral confinement to prevent distortion of the cross-sectional shape imposed on the material at the originating end of the column and simultaneously subjecting the column to the influence of a refrigerating medium to lower the temperature of the material progressively during its movement sufficiently to fix its cross-sectional shape and compact and freeze the fragments into a hard, rigid mass, and then severing from the other end of the column a section equal in thickness to the thickness of the desired cake.

3. A method of reducing discrete fragments of soft meat material to a solid hard cake differing in shape and dimensions from its component fragments which consists in forming a column of the fragments to provide a body having uniformly throughout the length of the column the cross-sectional shape of the desired cake, continuously supplying material to the originating end of the column, moving the column along a rectilinear path by substantially continuously applying pressure axially to said end of the column, and simultaneously lowering the temperature of the shaped column progressively during its movement sufficiently to fix its shape and compact and freeze the fragments into a hard, rigid mass, and then severing from the other end of the column a section equal in thickness to the thickness of the desired cake.

In testimony whereof I affix my signature.

EDWARD H. COOLEY.